United States Patent [19]
Iwata

[11] Patent Number: 4,962,738
[45] Date of Patent: Oct. 16, 1990

[54] IGNITION CONTROL SYSTEM FOR AN INTERNAL COMBUSTION ENGINE

[75] Inventor: Toshio Iwata, Himeji, Japan

[73] Assignee: Mitsubishi Denki Kabushiki Kaisha, Tokyo, Japan

[21] Appl. No.: 412,956

[22] Filed: Sep. 26, 1989

[30] Foreign Application Priority Data

Sep. 27, 1988 [JP] Japan .................. 63-239743
Sep. 27, 1988 [JP] Japan .................. 63-239744

[51] Int. Cl.$^5$ .................. F02P 5/14; F02P 5/145
[52] U.S. Cl. .................. 123/425; 123/479; 123/414
[58] Field of Search ............ 123/414, 417, 425, 435, 123/479, 612, 652

[56] References Cited

U.S. PATENT DOCUMENTS

| | | | |
|---|---|---|---|
| 4,466,405 | 8/1984 | Hattori et al. | 123/425 X |
| 4,485,784 | 12/1984 | Fujii et al. | 123/414 X |
| 4,502,447 | 3/1985 | Schnurle et al. | 123/479 |
| 4,531,399 | 7/1985 | Aono | 73/4 R |
| 4,664,082 | 5/1987 | Suzuki | 123/479 X |
| 4,675,821 | 6/1987 | Aoki et al. | 123/425 X |
| 4,729,358 | 3/1988 | Morita et al. | 123/425 X |
| 4,788,956 | 12/1988 | Suzuki et al. | 123/414 |
| 4,819,171 | 4/1989 | Morita | 123/425 X |
| 4,848,299 | 7/1989 | Satoh et al. | 123/425 |

FOREIGN PATENT DOCUMENTS 0093936 5/1984 Japan .................. 123/479
0019941 2/1985 Japan .................. 123/479

*Primary Examiner*—Willis R. Wolfe
*Attorney, Agent, or Firm*—Sughrue, Mion, Zinn, Macpeak and Seas

[57] ABSTRACT

An ignition control system for an internal combustion engine adapted to control ignition timing based on the internal pressure in an engine cylinder. In one embodiment, ignition timing is determined based mainly on the rotational position (i.e., crank angle) of a crankshaft sensed by a crank angle sensor at the time or normal operation of the crank angle sensor, whereas it is determined based on the internal pressure in the engine cylinder sensed by a cylinder internal pressure sensor at the time of failure in the crank angle sensor. In the latter case, the output of cylinder internal pressure sensor is differentiated and then compared with a reference signal of a predetermined level so that ignition is effected when the differentiator output crosses the reference signal level for the second time per engine cycle. In another embodiment, a target ignition timing is determined based on the internal pressure in the engine cylinder and the intake pressure in an intake pipe. When the internal pressure in the engine cylinder as sensed by a cylinder internal pressure sensor becomes equal to the target ignition timing, ignition is effected.

7 Claims, 4 Drawing Sheets

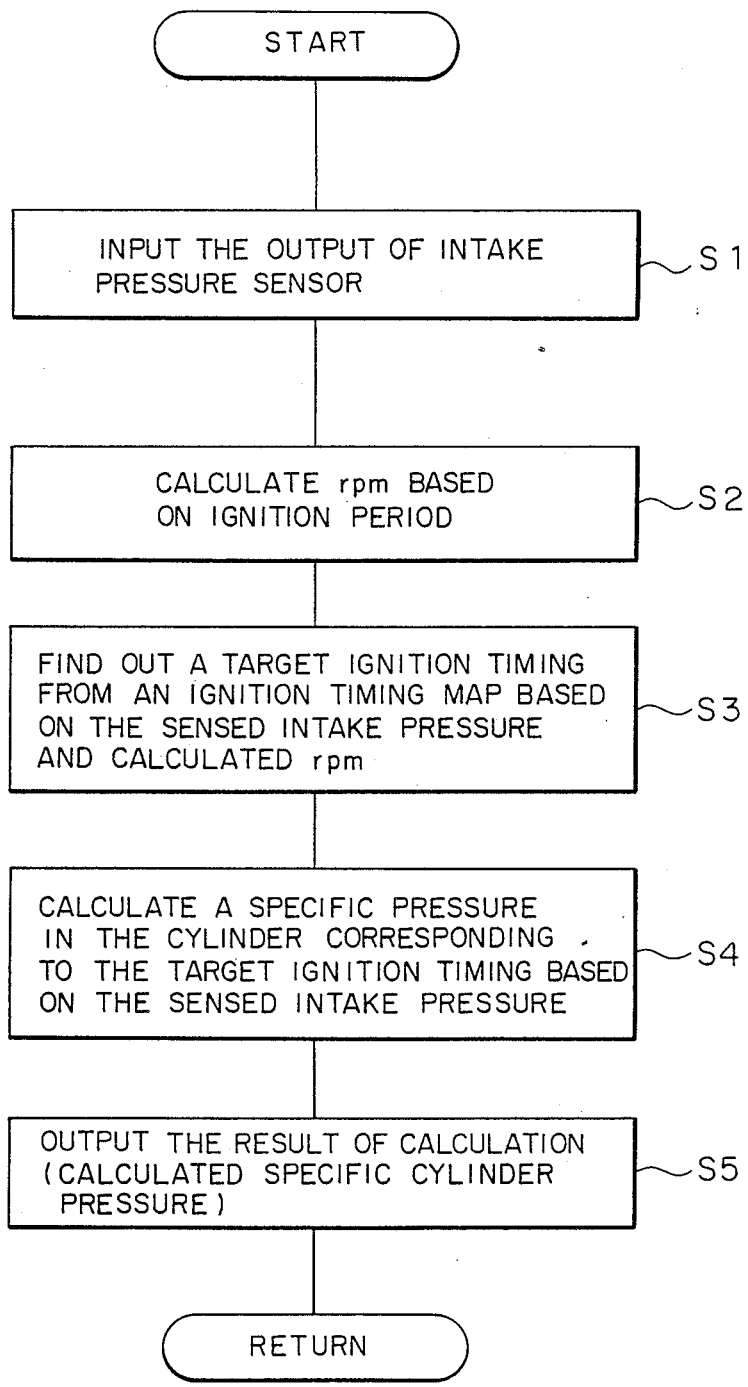

4,962,738

IGNITION CONTROL SYSTEM FOR AN INTERNAL COMBUSTION ENGINE

BACKGROUND OF THE INVENTION

1. Field of the Invention

The present invention relates to an ignition control system for an internal combustion engine in which ignition timing is controlled based on the rotational position (i.e., crank angle) of a crankshaft which is sensed by a crank angle sensor.

2. Description of the Related Art

In a known ignition control system for an internal combustion engine, when the engine is operating, the rotational position of a crankshaft is first sensed by a crank angle sensor which outputs a signal representative of the sensed crankshaft rotational position to a microcomputer including a CPU, a RAM and a ROM where it is temporarily stored in the RAM. An intake pressure sensor senses the intake pressure in an intake pipe of the engine representative of the engine load condition and outputs a signal representative of the sensed intake pressure to the CPU through an analog to digital (A/D) converter which converts the output in the form of an analog signal of the intake pressure sensor into a digital signal which is temporarily stored in the RAM. The CPU calculates the number of revolutions per minute of the engine based on an ignition period which is obtained through the crank angle sensor by using a calculation program previously stored in the ROM. Based on the number of revolutions per minute of the engine thus calculated and the output signal from the intake pressure sensor representative of the engine load condition, the CPU determines, by making reference to an ignition timing map previously stored in the ROM, appropriate ignition timing which is then fed to an ignition device to turn on and off a power transistor incorporated therein for temporarily interrupting the current supply to a primary side of an ignition coil so that a high voltage is thereby generated on a Secondary side of the ignition coil, thus causing a spark plug to electrically spark for firing an air/fuel mixture in an engine cylinder.

With the abovementioned ignition control system in which ignition timing is determined based on the output signal of the crank angle sensor, determination of ignition timing can not be made at all in the case of failure in the crank angle sensor with the result that the engine is stopped. Further, the mounting position of the crank angle sensor, which is mounted on a cam shaft by a fastener such as a fastening belt or the like, may sometime be displaced from the original correct position due, for example, to loosening or slackening of the fastening belt or the like so that the exact rotational position of the crankshaft can not be sensed.

SUMMARY OF THE INVENTION

In view of the above, the present invention is intended to obviate the above described problems of the known ignition control system.

An object of the present invention is to provide an ignition control system for an internal combustion engine which is capable of ensuring the proper operation of the engine even in cases where a crank angle sensor failed.

Another object of the present invention is to provide an ignition control system for an internal combustion engine which is able to determine appropriate ignition timing without employing a crank angle sensor.

Bearing the above objects in mind, the present invention resides, according to one aspect, in an ignition control system for an internal combustion engine having an engine cylinder and a crankshaft comprising:

rotational position sensing means for sensing the rotational position of the crankshaft and generating an output representative of the sensed crankshaft rotational position;

engine load sensing means for sensing an engine load and generating an output representative of the sensed engine load;

cylinder internal pressure sensing means for sensing the pressure in the engine cylinder and generating an output representative of the sensed cylinder internal pressure;

ignition timing determining means connected to receive the outputs of the rotational position sensing means and the engine load sensing means for determining appropriate ignition timing based on the sensed rotational position of the crankshaft and the sensed engine load at the time of normal operation of the rotational position sensing means, the ignition timing determining means being further connected to receive the output of the cylinder internal pressure sensing means for determining appropriate ignition timing based on the sensed cylinder internal pressure at the time of failure in the rotational position sensing means; and igniting means connected to receive the output of the ignition timing determining means for igniting the engine at the ignition timing which is determined by the ignition timing determining means.

The ignition timing determining means comprises:

a differentiator connected to receive the output of the cylinder internal pressure sensor for differentiating the cylinder internal pressure sensor output;

a comparator connected to receive the output of the differentiator for comparing the differentiator output with a reference signal of a predetermined level; and a microcomputer connected to receive the output of the comparator for controlling the operation of the igniting means based on the comparator output in case of failure in the rotational position sensing means in a manner such that the igniting means effects ignition when he differentiator output crosses the reference signal level for the second time per engine cycle.

In one embodiment, the comparator outputs a series of discrete pulses per engine cycle, each of the pulses having a rising edge which occurs when the differentiator output increases above the reference signal level and a falling edge which occurs when the differentiator output decreases below the reference signal level. The microcomputer controls the igniting means in such a manner that the igniting means effects ignition only when the falling edge of a first one of the series of pulses occurs.

In another embodiment, the comparator outputs a series of discrete pulses per engine cycle, each of the pulses having a falling edge which occurs when the differentiator output increases above the reference signal level and a rising edge which occurs when the differentiator output decreases below the reference signal level. The microcomputer controls the igniting means in such a manner that the igniting means effects ignition only when the rising edge of a first one of the series of pulses occurs.

According to another aspect, the present invention resides in an ignition control system for an internal combustion engine having an engine cylinder and a crankshaft comprising:

cylinder internal pressure sensing means for sensing the pressure in the engine cylinder and generating an output representative of the sensed engine cylinder pressure;

ignition timing determining means for determining appropriate ignition timing based on the operating conditions of the engine;

reference signal generating means for calculating a specific pressure in the engine cylinder which corresponds to the ignition timing determined by the ignition timing determining means and generating a reference signal representative of the specific pressure;

ignition signal generating means connected to receive the outputs of the ignition timing determining means and the reference signal generating means for generating an ignition signal at the time when the output of the cylinder internal pressure sensing means becomes equal to the output of the reference signal generating means; and igniting means connected to receive the output of the ignition signal generating means for igniting the engine when it receives an ignition signal from the ignition signal generating means.

The ignition timing determining means comprises:

engine load sensing means for sensing an engine load;

ignition period sensing means for sensing an ignition period of the engine;

microcomputer connected to receive the outputs of the engine load sensing means and the ignition period sensing means, the microcomputer calculating the number of revolutions per minute of the engine based on the sensed ignition period, the microcomputer further determining appropriate ignition timing based on the sensed engine load and the calculated number of revolutions per minute of the engine.

The above and other objects, features and advantages of the present invention will become apparent from the following detailed description of a few preferred embodiments thereof taken in conjunction with the accompanying drawings.

BRIEF DESCRIPTION OF THE DRAWINGS

FIG. 4 is a flowchart showing the operational process of the ignition control system of FIG. 3.

DESCRIPTION OF PREFERRED EMBODIMENTS

Now, the present invention will be described in detail with reference to a few presently preferred embodiments thereof as illustrated in the accompanying drawings.

Figure 1:
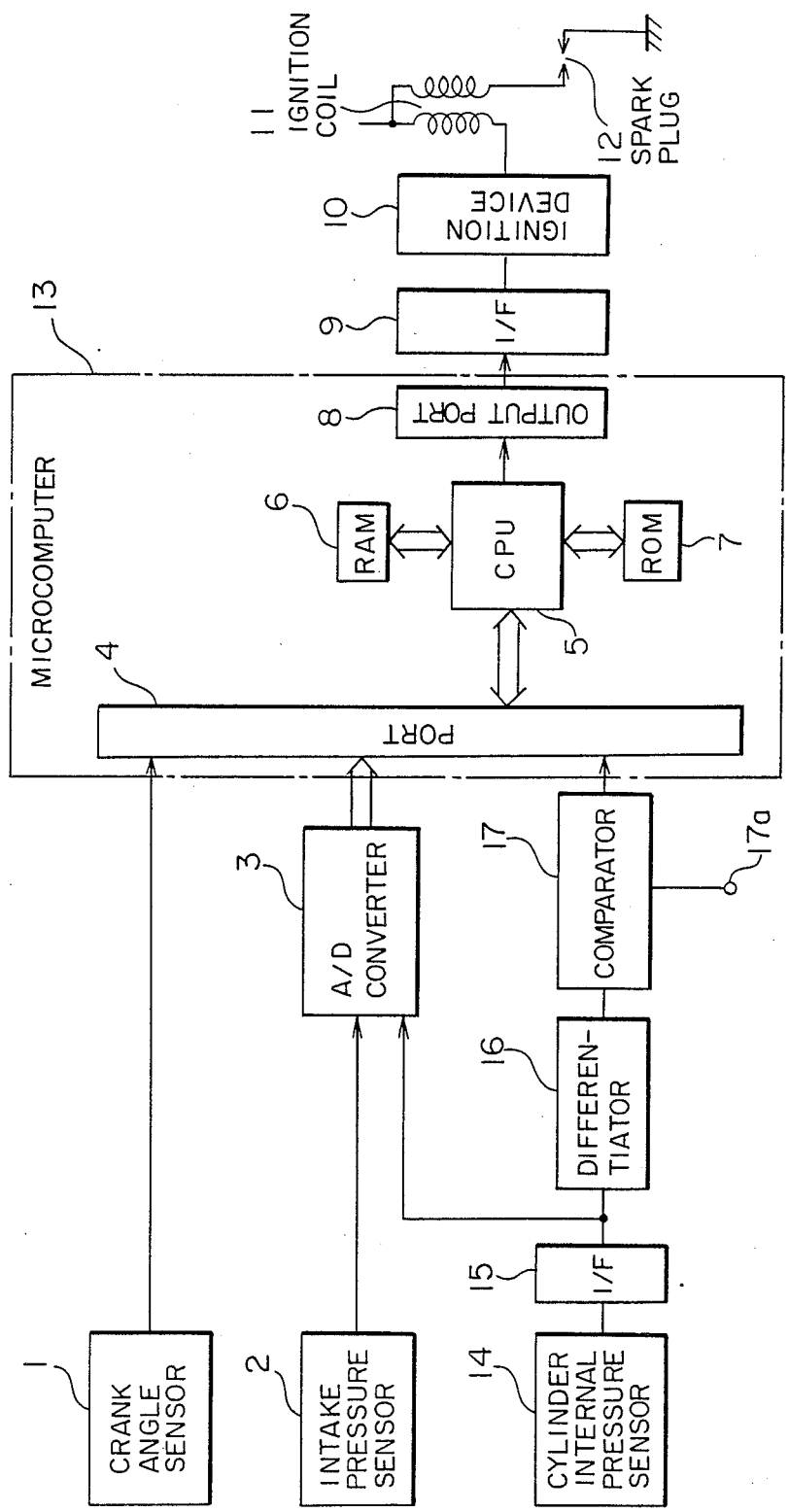
FIG. 1 is a block diagram of an ignition control system for an internal combution engine in accordance with a preferred embodiment of the present invention.
Figure 2:
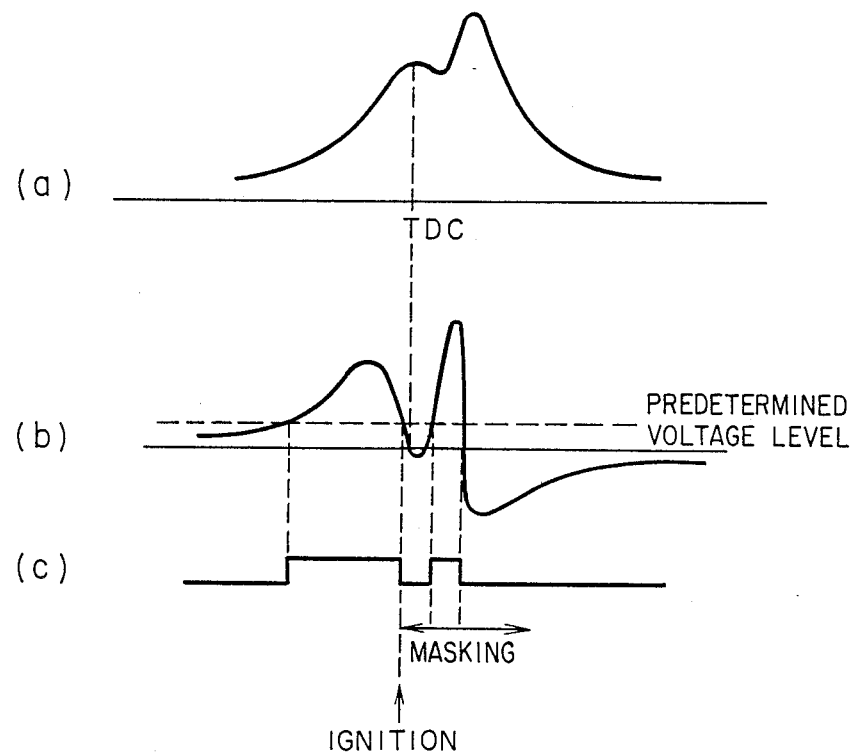
FIG. 2 is a waveform diagram in which (a) shows the waveform of the output of a cylinder internal pressure sensor of FIG 1; (b) shows the waveform of the output of a differentiation circuit of FIG. 1; and (c) shows the waveform of the output of a comparator circuit of FIG. 1.

First, FIGS. 1 and 2 show a first preferred embodiment of the present invention. In FIG. 1, there is schematically illustrated in the block form an ignition control system for an internal combustion engine which includes a rotational position sensor in the form of a crank angle sensor 1 for sensing the rotational position or crank angle of a crankshaft of an engine, an engine load sensor 2 in the form of an intake pressure sensor for sensing the intake pressure in an intake pipe or manifold of the engine representative of the load condition thereof, and an analog to digital (A/D) converter circuit 3 for converting the analog output of the intake pressure sensor 2 into a digital signal which is appropriate for processing by a microcomputer 13. The microcomputer 13 comprises a port 4 connected at its input side with the output terminals of the crank angle sensor 1 and the A/D converter circuit 3, a CPU 5 connected through a bus with the port 4, a RAM 6 and a ROM 7 connected with the CPU 5 through respective buses, and an output port 8 connected with the CPU 5. The ROM 7 beforehand stores an ignition timing determination program, a number-of-revolutions-per-minute versus ignition-timing map, an engine-load versus ignition-timing map and the like. The output port 8 of the microcomputer 13 is connected with an ignition device 10 in the form of a well-known type igniter through an interface 9. The ignition device 10 has an unillustrated power transistor coupled with a primary side of an ignition coil 11 so that the power transistor is turned on and off to generate a high voltage on a secondary side of the ignition coil 11, thereby causing a spark plug 12 connected with the secondary side of the ignition coil 11 to spark whereby an air/fuel mixture in the engine cylinder is fired.

The ignition control system of the invention further comprises a cylinder internal pressure sensor 14 for sensing the condition of combustion in the combustion chamber of a engine cylinder, an interface 15 coupled at its input side with the output side of the cylinder internal pressure sensor 14, a differentiation circuit 16 coupled with the output side of the interface 15, and a comparator circuit 17 which has one of two input terminals coupled with the output side of the differentiation circuit 16 and the other input terminal 17a imposed upon with a reference signal of a predetermined voltage level for comparing the output of the differentiation circuit 16 and the reference signal and outputting a comparison signal to the port 4 of the microcomputer 13. The interface 15 is also coupled at its output side with the A/D converter circuit 3.

In the case of normal operation of the crank angle sensor 1, when the engine starts to operate, the crank angle sensor 1 senses the rotational position or crank angle of the unillustrated crankshaft and outputs through the port 4 to the CPU 5 a signal representative of the sensed crank angle which is temporarily stored in the RAM 6. The intake pressure sensor 2 senses the intake pressure in the intake manifold representative of the load condition of the engine and outputs an analog signal representative of the sensed intake pressure to the A/D converter 3 which converts the analog signal into a digitized signal. The digital signal thus converted is input through the port 4 to the CPU 5 and then temporarily stored in the RAM 6. The CPU 5 calculates the number of revolutions per minute of the engine based on an ignition period which is obtained through the output of the crank angle sensor 1 by using the calculation program prestored in the ROM 7. Further, based on the number of revolutions per minute of the engine thus calculated and the output of the intake pressure sensor 2 representative of the engine load condition, the CPU 5 determines appropriate ignition timing by making reference to the ignition timing map prestored in the ROM 7, and sends out an ignition timing signal to the ignition device 10 through the output port 8 and the interface 9 so that the unillustrated power transistor of the ignition device 10 is thereby turned on and off to generate a high voltage on the secondary side of the ignition coil 11, whereby the spark plug 12 is caused to spark, firing an air/fuel mixture in the engine cylinder.

On the other hand, in cases where the crank angle sensor 1 fails, ignition is effected by means of the output signal of the cylinder internal pressure sensor 14 in the following manner. First, the output signal of an analog waveform as shown in FIG. 2(a) of the cylinder internal pressure sensor 14 is imposed through the interface 15 upon the differentiation circuit 16 where it is differentiated to provide a signal of a waveform as shown in FIG. 2(b). This signal is input from the differentiation circuit 16 to one input terminal of the comparator circuit 17 where it is compared with the reference signal of a predetermined voltage level which is imposed upon the other input terminal 17a. The comparator circuit 17 provides a series of discrete output pulses each in a rectangular shape per engine cycle. Each of the rectangular-shaped output pulses of the comparator circuit 17 has a rising edge which occurs at the time when the output of the differentiation circuit 16 increases above the predetermined voltage level of the reference signal, and a falling edge which occurs when the output of the differentiation circuit 16 decreases below the reference signal level, as shown in FIG. 2(c). The CPU 5 detects the falling edge of a first one of the series of output pulses and sends a detection signal to the ignition device 10 through the output port 8 and the interface 9, but it masks or neglects other falling edges of the following pulses if they are detected. Then, the ignition device 10 is driven by the detection signal of the CPU 5 so as to cut off the current supply to the ignition coil 11 whereby the spark plug 12 is caused to spark. Here, it is to he noted that the voltage level of the reference signal is determined such that the fall of the first pulse occurs just prior to the time when the piston in the engine cylinder reaches top dead center. In this manner, the engine can continue to operate properly even in the case of failure in the crank angle sensor 1.

Here, it will be understood that the comparator circuit 17 may be constructed such that it generates a series of rectangular-shaped pulses per engine cycle, each of the pulses having a rising edge which occurs when the output of the differentiation circuit 16 decreases below the reference signal level, and a falling edge which occurs when the output of the differentiation circuit 16 increases above the reference signal level. In this case, the CPU 5 detects the rising edge of a first one of the series of output pulses and generates a detection signal, but it masks or neglects other rising edges of the following pulses if they are detected.

Figure 3:
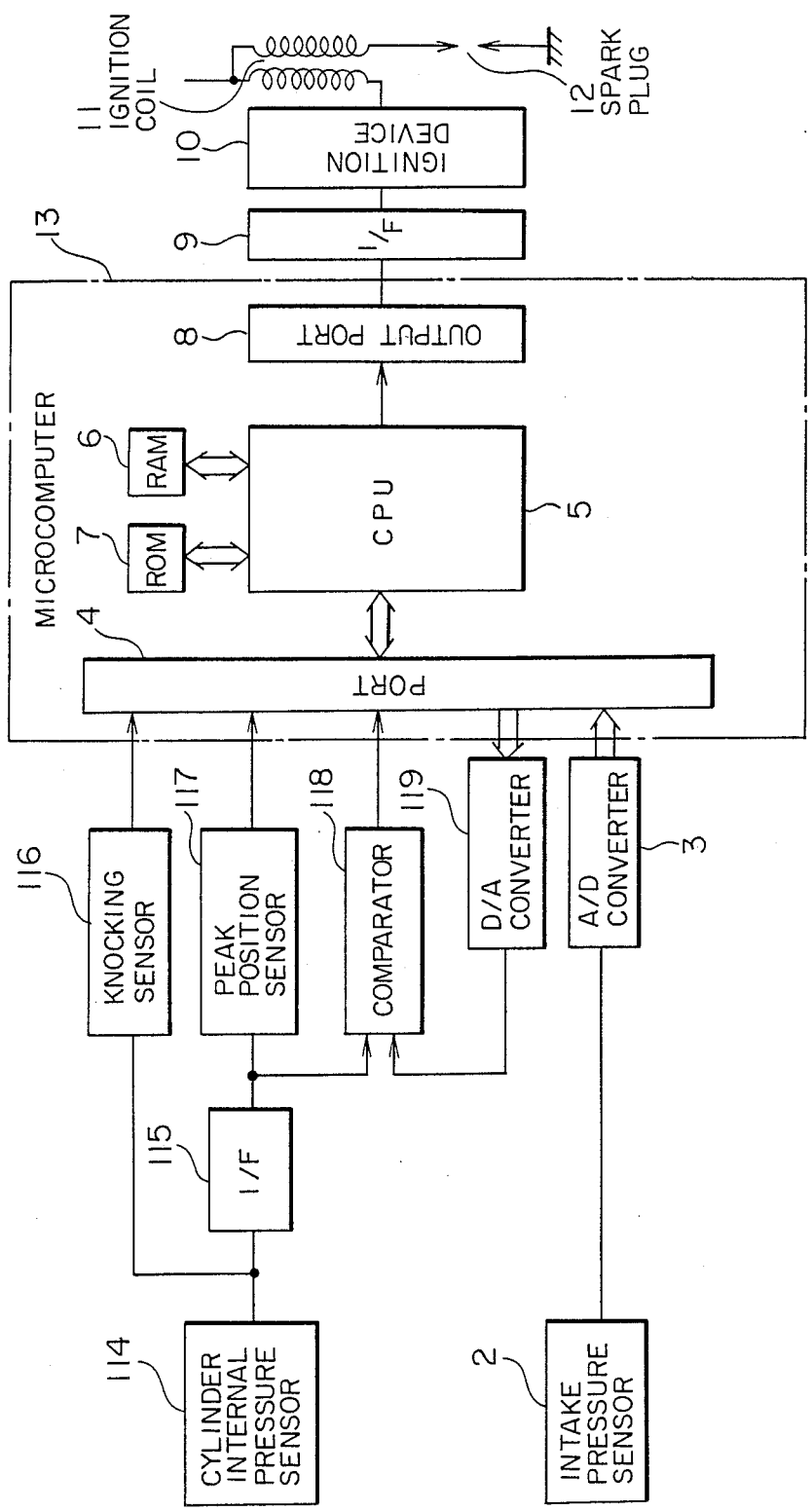
FIG. 3 is a block diagram of an ignition control system for an internal combustion engine in accordance with another preferred embodiment of the present invention.

FIGS. 3 and 4 show another embodiment of the present invention. The ignition control system illustrated in FIG. 3 includes, in addition to elements 2 through 13 which are the same as those employed in the previous embodiment depicted in FIG. 1, a cylinder internal pressure sensor 114 for sensing the pressure in a combution chamber of an engine cylinder, an interface 115 coupled at its input side with the cylinder internal pressure sensor 114, a knocking sensor 116 coupled at its input side with the cylinder internal pressure sensor 114 for sensing a knocking in the engine cylinder based on the output of the cylinder internal pressure sensor 114 and at its output side with the port 4 for outputting a knocking signal to the port 4 when a knocking is sensed, a peak position sensor 117 coupled at its input side with the interface 115 for sensing the position (or point in time) of a peak in the output of the cylinder internal pressure sensor 114 and at its output side with the port 4, and a comparator 118 having two input terminals one of which is coupled with the interface 115 and the other of which is coupled with the output side of a digital to analog (D/A) converter 119, and one output terminal coupled with the port 4. The D/A converter 119 is coupled at its input side with the CPU 5 through a bus and the port 4.

FIG. 4 is a flowchart showing the main routine of the operation of the ignition control system of FIG. 3. As illustrated in this flowchart, the output of the intake pressure sensor 2 representative of the sensed pressure in an intake pipe or manifold of the engine is converted from an analog value into a digital value by the A/D converter 3, and the digital value thus converted is then input to the CPU 5 of the microcomputer 13 through the port 4 in step S1. Subsequently in step S2, the CPU 5 calculates the number of revolutions per minute of the engine based on the period of ignition which is measured by an ignition period sensing means. The control process then proceeds to step S3 where an appropriate target ignition timing corresponding to the intake pressure sensed by the intake pressure sensor 3 and the number of revolutions per minute of the engine as previously determined in steps S1 and S2 is found from an ignition timing map stored in the ROM 6. Thereafter in step S4, the pressure in the combustion chamber of the engine cylinder corresponding to the thus determined target ignition timing is calculated from the intake pressure in the intake pipe or manifold as sensed by the intake pressure sensor 2 in the following manner.

Designating the pressure in and the internal volume of the cumbustion chamber in the engine cylinder as P and V, respectively, the following equation is established:

P·V = constant.

Here, $$V = r(1-\cos\theta) \cdot S + \alpha \tag{1}$$

where r = the radius of rotation of the crank shaft $\theta$ = the crank angle measured from the point at which ignition occurs;

S = the cross-sectional area of the piston; and $\alpha$ = the volume of the combustion chamber at TDC.

In this connection, it is to be noted that r, S and $\alpha$ are respectively of constant values.

Accordingly, the internal pressure P in the combustion chamber of the cylinder (hereinafter referred to as cylinder internal pressure) is described as follows.

$$P = \{r(1-\cos\theta_o) \cdot S + \alpha\} / \{r(1-\cos\theta) \cdot S + \alpha\} \cdot P_o \tag{2}$$

where $P_o$ = a reference pressure (equal to the pressure in the intake pipe or manifold); and $\theta_o$ = a reference crank angle (corresponding to the crank angle at which an intake valve is closed).

Substituting known values for the constants in equation (2) above, the cylinder internal pressure P is calculated as a function of the crank angle $\theta$. Thus, a specific cylinder internal pressure for ignition is determined by giving a specific crank angle at which ignition is to take place.

Thereafter in step S5, the CPU 5 outputs the result of the above calculation (i.e., the specific cylinder internal pressure) thus obtained to the D/A converter 119 through the port 4. The D/A converter 119 converts the digitalized input from the CPU 5 into an analog value which is then input to one of the input terminals of the comparator 118.

On the other hand, imposed on the other input terminal of the comparator 118 is the output of the cylinder internal pressure sensor 114 through the interface 115. When the output of the cylinder internal pressure sensor 114 becomes equal to the calculated specific value which is input to the one input terminal of the comparator 118 from the CPU 5, the comparator 118 outputs a matching signal to the CPU 5 through the port 4. Upon receipt of this matching signal, the CPU 5 acts to drive the ignition device 10 in the same manner as in the aforementioned first embodiment to produce a high voltage on the secondary side of the ignition coil 11 whereby the spark plug 12 is caused to spark. In this manner, it is possible to properly control ignition timing by use of the cylinder internal pressure without employing any crank angle sensor.

What is claimed is:

1. An ignition control system for an internal combustion engine having an engine cylinder and a crankshaft comprising:
    rotational position sensing means for sensing the rotational position of the crankshaft and generating an output representative of the sensed crankshaft rotational position;
    engine load sensing means for sensing an engine load and generating an output representative of the sensed engine load;
    cylinder internal pressure sensing means for sensing the pressure in the engine cylinder and generating an output representative of the sensed cylinder internal pressure;
    ignition timing determining means connected to receive the outputs of said rotational position sensing means and said engine load sensing means for determining appropriate ignition timing based on the sensed rotational position of the crankshaft and the sensed engine load at the time of normal operation of said rotational position sensing means, said ignition timing determining means being further connected to receive the output of said cylinder internal pressure sensing means for determining appropriate ignition timing based on the sensed cylinder internal pressure at the time of failure in said rotational position sensing means; and
    igniting means connected to receive the output of said ignition timing determining means for igniting the engine at the ignition timing which is determined by said ignition timing determining means.

2. An ignition control system for an internal combustion engine as claimed in claim 1, wherein said ignition timing determining means comprises:
    a differentiator connected to receive the output of said cylinder internal pressure sensor for differentiating the cylinder internal pressure sensor output;
    a comparator connected to receive the output of said differentiator for comparing the differentiator output with a reference signal of a predetermined level; and
    a microcomputer connected to receive the output of said comparator for controlling the operation of said igniting means based on the comparator output in case of failure in said rotational position sensing means in a manner such that said igniting means effects ignition when the differentiator output crosses the reference signal level for the second time per engine cycle.

3. An ignition control system for an internal combustion engine as claimed in claim 2, wherein said comparator outputs a series of discrete pulses per engine cycle, each of said pulses having a rising edge which occurs when the differentiator output increases above said reference signal level and a falling edge which occurs when the differentiator output decreases below said reference signal level, said microcomputer being adapted to control said igniting means in such a manner that said igniting means effects ignition only when the falling edge of a first one of aid series of pulses occurs.

4. An ignition control system for an internal combustion engine as claimed in claim 2, wherein said comparator outputs a series of discrete pulses per engine cycle, each of said pulses having a falling edge which occurs when the differentiator output increases above said reference signal level and a rising edge which occurs when the differentiator output decreases below s id reference signal level, said microcomputer being adapted to control said igniting means in such a manner that said igniting means effects ignition only when the rising edge of a first one of said series of pulses occurs.

5. An ignition control system for an internal combustion engine having an engine cylinder and a crankshaft comprising:
    cylinder internal pressure sensing means for sensing the pressure in the engine cylinder and generating an output representative of the sensed engine cylinder pressure;
    ignition timing determining means for determining an appropriate target ignition timing based on sensed operating conditions of the engine;
    reference signal generating means for calculating a specific pressure in the engine cylinder which corresponds to the target ignition timing determined by said ignition timing determining means, and for generating a reference signal representative of said specific pressure in the engine cylinder;
    ignition signal generating means connected to receive the outputs of said cylinder internal pressure sensing means and said reference signal generating means for generating an ignition signal at the time when the output of said cylinder internal pressure sensing means becomes equal to the output of said reference signal generating means; and
    igniting means connected to receive the output of said ignition signal generating means for igniting the engine when it receives an ignition signal from said ignition signal generating means.

6. An ignition control system for an internal combustion engine as claimed in claim 5, wherein said ignition timing determining means comprises:
    engine load sensing means for sensing an engine load; and
    ignition period sensing means for sensing an ignition period of the engine; and a microcomputer connected to receive the outputs of said engine load sensing means and said ignition period means, said microcomputer calculating the number of revolutions per minute of the engine based on the sensed on period said microcomputer further determining said appropriate target ignition timing based on the sensed engine load and the calculated number of revolutions per minute of the 7. An ignition control system for an internal combustion engine as claimed in claim 6, wherein said reference signal generating means calculates said specific pressure in the engine cylinder corresponding to the above determined ignition timing using the following formula;

$$P = \{r(1-\cos\theta_o) \cdot S + \alpha\} / \{r(1-\cos\theta) \cdot S + \alpha\} \cdot P_o$$

Where
- $P =$ specific pressure in the engine cylinder;
- $P_o =$ pressure (equal to the pressure in the intake manifold);
- $R =$ the radius of rotation of the crank shaft;
- $\theta =$ the crank angle measured from the point at which ignition occurs;
- $\theta_o =$ a reference crank angle (corresponding to the crank angle at which an intake valve is closed);
- $S =$ the cross-sectional area of the piston;
- $\alpha =$ the volume of the combustion chamber at TDC.

* * * * *